United States Patent [19]

Obeda

[11] 4,032,382

[45] June 28, 1977

[54] METHOD AND APPARATUS FOR SPLICING THERMOPLASTIC MONOFILAMENT MATERIAL BY HIGH FREQUENCY VIBRATORY ENERGY

[75] Inventor: Edward G. Obeda, Brookfield, Conn.

[73] Assignee: Branson Ultrasonics Corporation, New Canaan, Conn.

[22] Filed: Nov. 15, 1976

[21] Appl. No.: 742,019

[52] U.S. Cl. .............................. 156/73.2; 156/158; 156/433; 228/1 R; 228/110; 228/243; 228/904; 264/23; 264/248; 425/446; 425/500
[51] Int. Cl.² ........................................... B32B 5/26
[58] Field of Search ................ 156/73.2, 158, 433; 228/110, 243, 1, DIG. 904; 264/23, 248; 425/446, 500

[56] References Cited

UNITED STATES PATENTS

| 3,616,064 | 10/1971 | Long et al. | 156/433 |
| 3,783,065 | 1/1974 | Stone | 156/158 |

*Primary Examiner*—Edward G. Whitby
*Attorney, Agent, or Firm*—Ervin B. Steinberg; Philip J. Feig

[57] ABSTRACT

A method and apparatus for splicing thermoplastic monofilament material by high frequency vibratory energy use a support having both forming means and an adjoining flash receiving cavity. Monofilaments to be spliced are disposed in the forming means in overlapping relationship. High frequency vibratory energy is applied to the overlap region softening the monofilaments while the excess thermoplastic material created during the splicing is extruded into the adjoining flash receiving cavity. The vibratory energy is removed and the softened material remaining in the forming means solidifies into a continuous monofilament having a predetermined cross sectional area.

11 Claims, 5 Drawing Figures

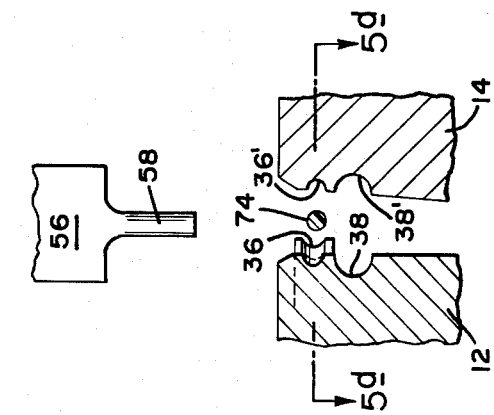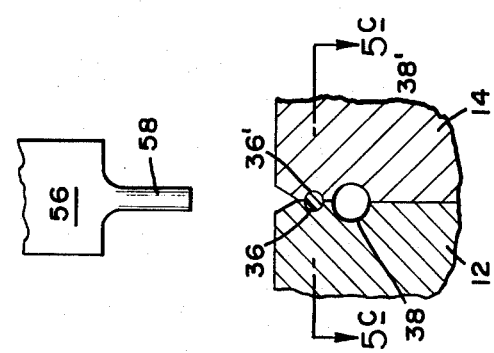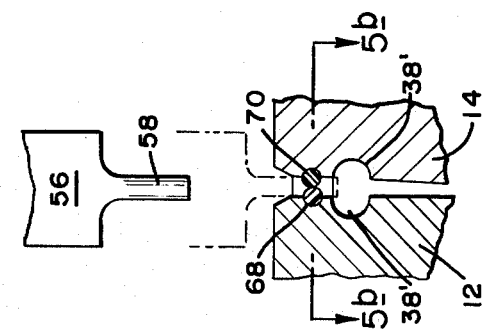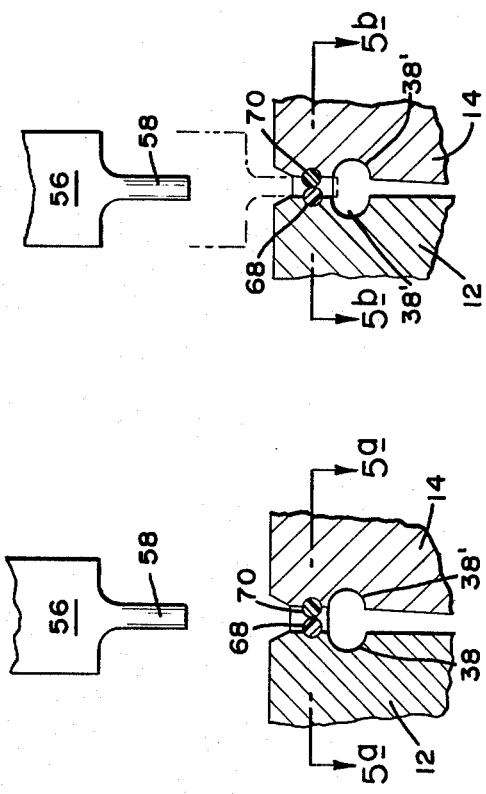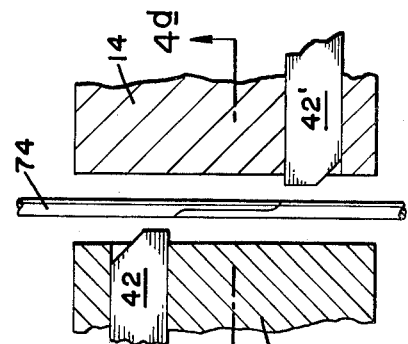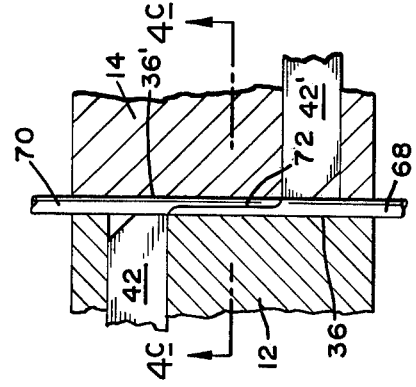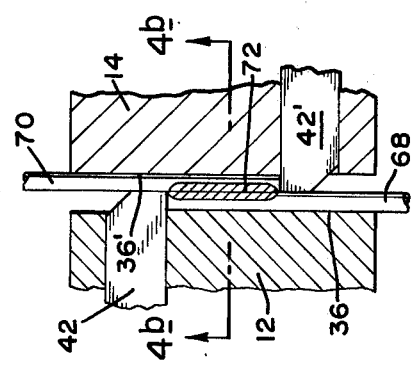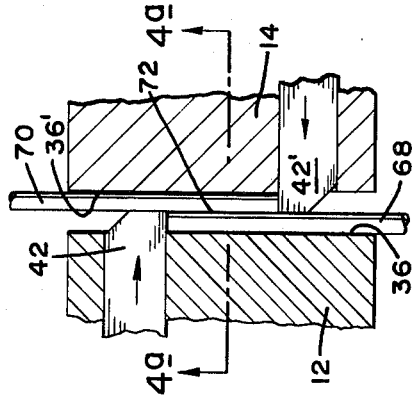

METHOD AND APPARATUS FOR SPLICING THERMOPLASTIC MONOFILAMENT MATERIAL BY HIGH FREQUENCY VIBRATORY ENERGY

SUMMARY OF THE INVENTION

The invention relates to a method and apparatus for splicing thermoplastic monofilament material by high frequency vibratory energy. Specifically, two thermoplastic monofilaments are spliced so as to provide a continuous monofilament having a diameter substantially equal to that of a respective one of the monofilaments.

In textile operations requiring continuous monofilament material, material from different spools is generally spliced, one to another, by knotting or cementing. Knot splices are bulky and undergo great difficulty in passing through guides, needle eyes and the like, whereas cement splices require excessive curing times. Moreover, splices which are larger than the original monofilament are unsightly and generally unacceptable in the final product.

In the prior art, specifically U.S. Pat. No. 3,616,064, to Long et al., entitled "Manufacture of Synthetic Textile Yarn" a support having a groove is disclosed for welding multifilament threadlines. The present invention provides an improvement over the prior art by using a support having a flash receiving cavity formed therein for receiving excess material created during the splicing operation resulting from the application of high frequency vibratory energy. The cavity receives excess material thereby permitting the resulting splice formed from the monofilament members to have a diameter equal to the diameter of the joined members.

Likewise, in U.S. Pat. No. 3,184,354 and 3,184,363, there is disclosed a method and apparatus for splicing multifilament yarn by the application of high frequency vibrations. When splicing multifilament yarn, as contrasted with monofilament material, it is possible to compress the yarn to form a splice having any desired diameter. In the present invention, substantially incompressible thermoplastic monofilament material is spliced by use of a support incorporating a flash receiving cavity to receive excess material created as a by-product of the splicing operation.

Generally, splicing monofilaments is accomplished by urging two monofilaments into intimate contact in the presence of high frequency vibratory energy. The energy causes a softening of juxtaposed portions of each monofilament and when the portions are urged together they unite to form a unitary monofilament. In the past, such splices caused an unevenness, often random appearance, along the length of the monofilament resulting in the rejection or degradation of products produced utilizing such spliced material. In the present invention, the resultant spliced thermoplastic monofilament exhibits the same diameter as each of the component monofilaments for providing an aesthetically acceptable and pleasing splice as well as a splice which can be used directly in a final product without any waste.

While the present invention relates primarily to splicing of thermoplastic monofilament material, any substantially incompressible monofilament capable of sustaining elastic vibratory energy can be spliced together consonant with the teaching herein. The invention is most suited for splicing thermoplastic monofilaments having a diameter between 0.125 and 2.5 millimeters. Moreover, the splice is performed by applying high frequency vibratory energy having a frequency in the range between 1 kHz and 100 kHz. The preferred frequency range is between 20 kHz and 60 kHz with best results being observed at approximately 50 kHz.

A principal object of the invention is therefore the provision of a method and apparatus for splicing thermoplastic monofilament material by applying high frequency vibratory energy, the resulting splice having the same diameter as the component monofilaments.

Another object of the invention is the provision of a support for use in splicing two thermoplastic monofilaments of the same diameter by high frequency vibratory energy, the support having forming means and an adjoining flash receiving cavity for forming a splice having the same diameter as that of a single monofilament.

A further object of this invention is the provision of means for providing a splice of two thermoplastic filaments, the splice having a predetermined cross sectional area.

Further and still other objects of this invention will become more readily apparent when the specification is read in conjunction with the accompanying drawings.

BRIEF DESCRIPTION OF THE DRAWINGS

FIGS. 4a–4d are partial elevational views of the support per FIG. 1 during different phases of the splicing process, and FIGS. 5a–5d are partial plan views of the support per FIGS. 4a–4d.

DETAILED DESCRIPTION OF THE INVENTION

Figure 1:
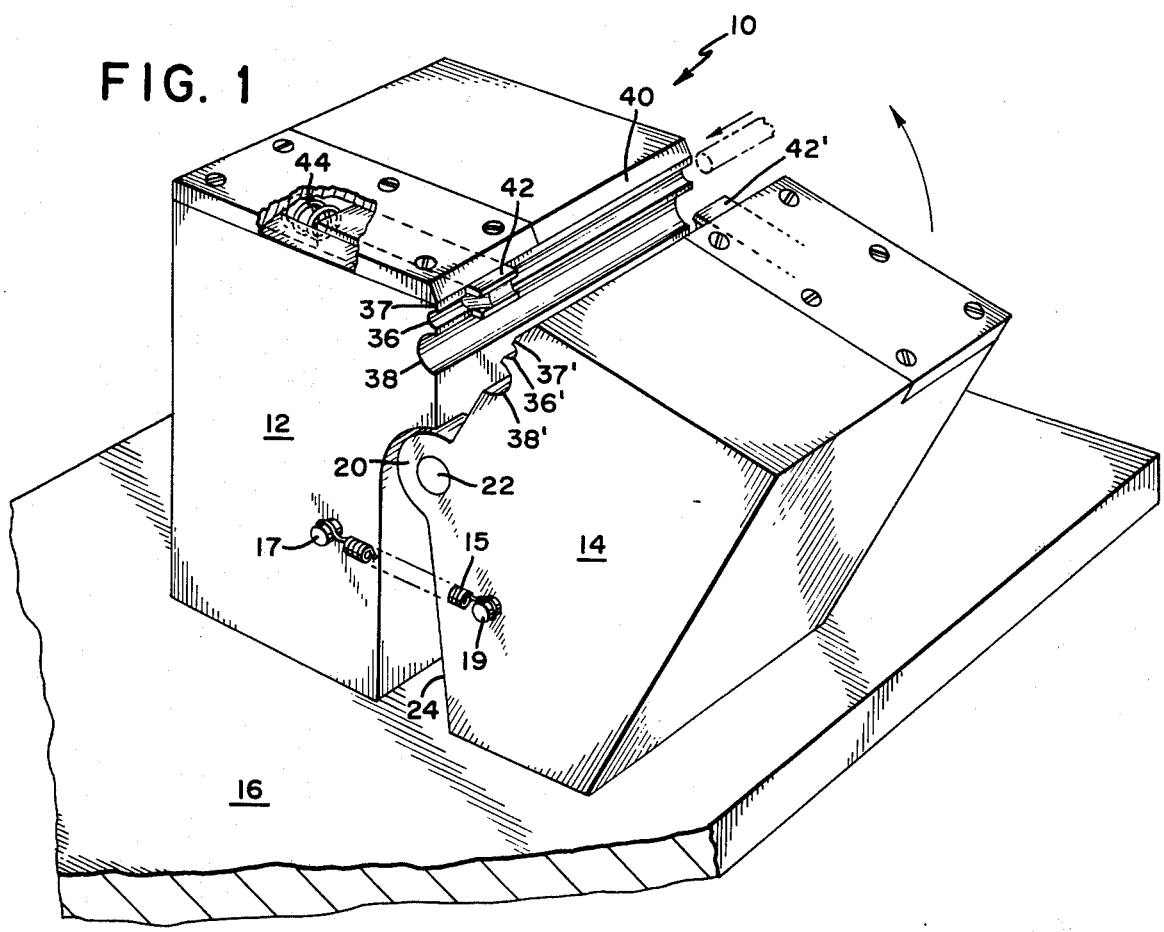
FIG. 1 is a perspective view of a preferred embodiment of a support for use in practicing the invention.
Figure 2:
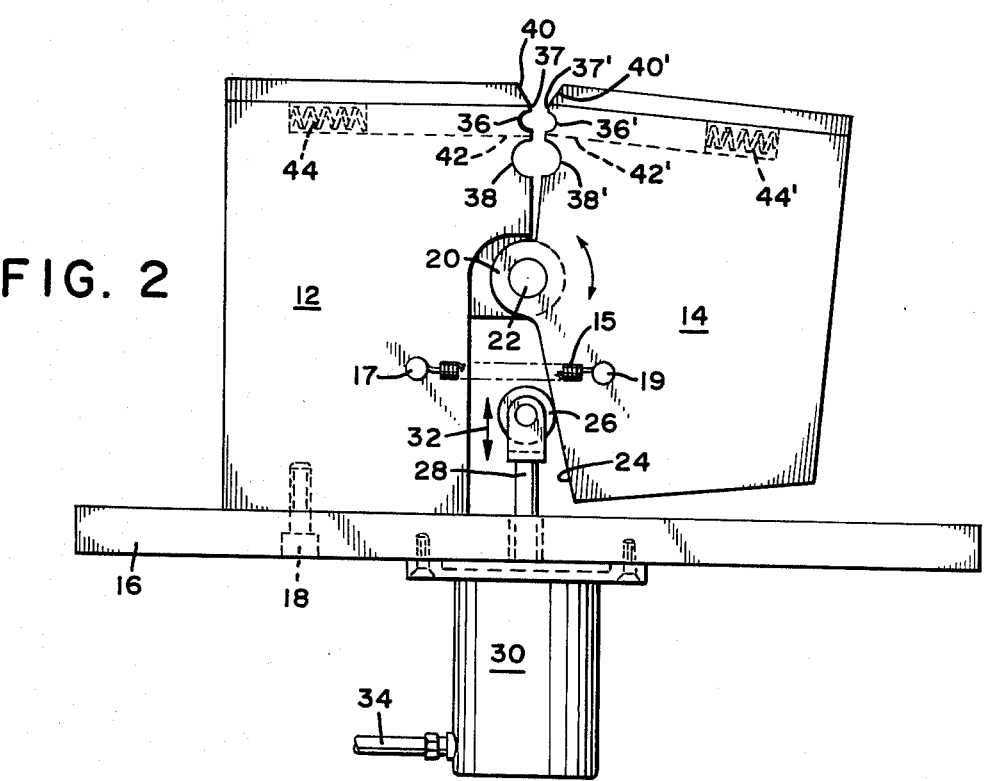
FIG. 2 is an elevational view of the support per FIG. 1.

Referring to the figures and FIGS. 1 and 2 in particular there is shown a preferred embodiment of a support 10 for splicing two monofilament thermoplastic members. The support 10 comprises two complementary mould portions 12 and 14 biased to remain in the position shown in FIGS. 1 and 2 by the force of a tension spring 15 which is coupled to the respective mould portions 12 and 14 by respective pins 17 and 19. The portion 12, rigidly affixed to platform 16 by a threaded bolt 18 passing through platform 16 into support portion 12, is shaped to fit between a set of hinge bushings 20 extending from the portion 14. A pin 22 passes through the bushings 20 and mould portion 12 to provide relative pivotal motion between the portions 12 and 14. The support portion 14 includes a cam surface for contact with a roller 26. The roller 24 is fixedly secured to the end of piston 28 of cylinder 30 (FIG. 2) for undergoing reciprocating translating motion in the direction of arrow 32 responsive to fluid pressure provided along conduit 34. The roller 26 when caused to travel along cam surface 24 in the upward direction as seen in FIGS. 1 and 2 causes the uppermost surfaces of mould portions 12 and 14 to be urged toward each other as will be explained in detail below.

Each mould portion 12 and 14 contains complementary semicircular workpiece forming cavity in the form of grooves 36 and 36' and adjoining semicircular flash receiving cavity in the shape of grooves 38 and 38'. Each portion 12 and 14 is provided also near its upper surface with a respective inclined surface 40 and 40' dimensioned for guiding a blade-shaped tip of a high frequency resonator into and away from the cavity formed by grooves 36 and 36'.

In an improvement, a pair of fingers 42 and 42' are radially urged into respective grooves 36 and 36' by springs 44 and 44' to provide for the alignment of the monofilaments to be spliced in proper overlapped position and for the support of the monofilaments during the application of vibratory energy.

Figure 3:
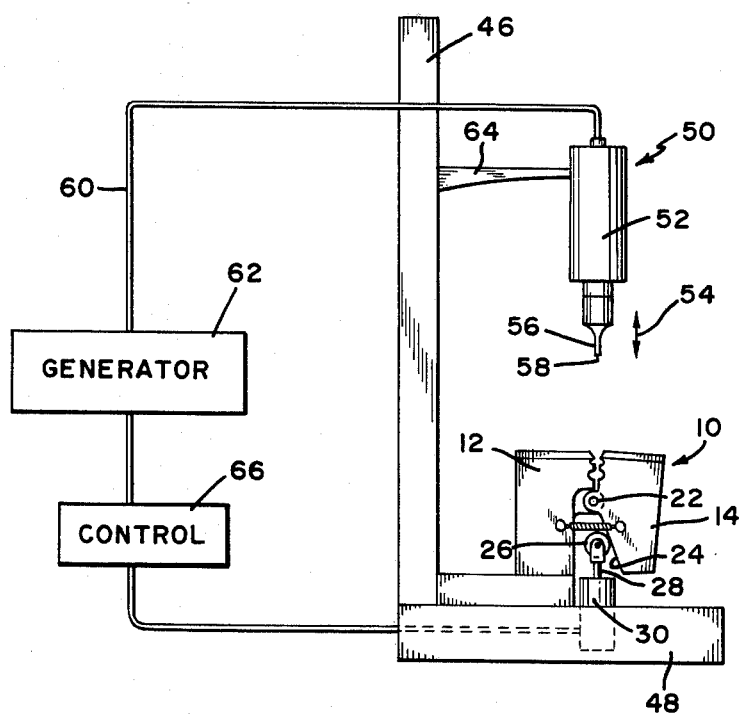
FIG. 3 is an elevational schematic diagram of an apparatus for practicing the invention.

An automatic apparatus for splicing two thermoplastic monofilament is shown in FIG. 3. A stand comprising an upright 46 and base 48 supports the support 10 and a high frequency converter assembly 50. The converter assembly 50 comprises an electroacoustic converter 52 for converting electrical energy having a frequency in the range between 1 kHz and 100 kHz into high frequency mechanical vibratory motion. A typical converter 52 for use in the present invention is shown in U.S. Pat. No. 3,328,610 issued June 27, 1967 to S. E. Jacke et al, entitled "Sonic Wave Generator".

Coupled to the converter 52 at an antinodal region of longitudinal motion is a half wavelength resonator 56 terminating in a blade shaped projection 58. The converter 52 and resonator 58 are each dimensioned to be resonant at the frequency of the electrical energy provided by the generator 62 via conductor 60 to the converter 52. When the converter is energized at the predetermined frequency, typically 50 kHz, the tip of the resonator 56, i.e. the blade-like projection, undergoes high frequency vibratory motion along the axial direction, as indicated by arrow 54.

Drive means (not shown) acting upon the brace 64 which supports the converter assembly 50 for motion along the upstanding member 46, causes the assembly 50 to undergo reciprocating vertical motion toward and away from the support 10 responsive to a signal from control means 66. Control means 66 provides control signals to actuate generator 62, drive means acting upon the brace 64 and cylinder 30 for splicing two thermoplastic monofilaments disposed in the semicircular grooves 36 and 36' of support 10 as will be explained hereafter in connection with FIGS. 4a–4d and 5a–5d.

The method of splicing two thermoplastic workpieces using high frequency vibratory energy as well as the operation and function of the various portions of support 10 are illustrated more clearly in FIGS. 4a–4d and 5a–5d. Two monofilaments 68 and 70 are urged into the semicircular forming grooves 36 and 36' until they reach the stop formed by the respective fingers 42 and 42' (FIG. 5a). Tension spring 15 is selected for biasing the support 10 in an open position a predetermined distance for causing the center of each monofilament to be aligned with edges 37 and 37' of respective grooves 36 and 36'. The fingers 42 and 42' in addition to providing a stop for the alignment of the thermoplastic monofilaments in overlapped relationship at region 72, also provide a means for maintaining the monofilaments in position during splicing.

After the monofilaments 68, 70, are in the position described, a singal from control unit 66 (FIG. 3) actuates the drive means for lowering the converter assembly 50. The fingers 42 and 42' maintain the monofilaments in position while the resonator 56 is being lowered. A second signal from control unit 66 to generator 62 causes a high frequency electrical signal to be manifest along the cable 60. The converter 52 upon receipt of the electrical signal converts the electrical signal to high frequency vibratory motion. The blade 58 of resonator 56 thus undergoes high frequency vibrating motion.

The drive means lowers the resonator 56, urging the blade 58 into the support 10 between the juxtaposed monofilaments 68 and 70 (FIG. 4b). The width of the blade 58 is dimensioned to be equal to the overlap region 72 of the monofilaments, thereby eliminating any trimming of the spliced monofilament. Moreover, the blade 58 thickness is dimensioned to be equal to the distance between the edges 37 and 37' of grooves 36 and 36' during the splicing operation for preventing excess thermoplastic material from flowing upwards out of grooves 36 and 36'. The monofilaments 68, 70 under the influence of the high frequency vibratory energy begin to soften and melt in the overlap region 72 seen in FIG. 5b. As the resonator 56 continues to travel through the forming cavity formed by grooves 36 and 36' into the adjoining flash receiving cavity formed by the grooves 38 and 38' the excess softened melted material from the juxtaposed portion of the monofilaments protruding beyond the edges 37 and 37' of grooves 36 and 36' is extruded into the flash receiving cavity, see FIG. 4b.

After the horn has traversed a predetermined distance, signals from control unit 66 to generator 62 and the drive means terminate the electrical signal to the converter 52 and cause the resonator 56 to quickly retract in the upward direction. Immediately upon the horn rising above the support 10, a signal from control unit 66 to cylinder 30 causes piston 28 and attached roller 26 to travel along cam surface 24. As the piston 28 extends from the cylinder 30, support portion 14 rotates about pin 22 causing the upper part of the two support portions 12 and 14 to close upon one another for forming a splice in region 72 of FIG. 5c. The two semicircular grooves 36 and 36' are in forced contact providing a circular forming cavity. During the forming of the splice, the spring loaded fingers 42, 42' are forced out of the forming cavity and into the support portions 12 and 14. The complementary forming grooves 36 and 36' are dimensioned for forming, when in forced contact, a circular forming cavity having a diameter of a predetermined cross section, preferably equal to the diameter of the individual thermoplastic monofilaments 68 and 70. As the two softened monofilaments 68, 70 solidify within the cavity created by grooves 36 and 36' a splice is formed in the region of overlap, the splice having a diameter equal to the diameter of the monofilaments 68, 70. In the adjoining flash receiving cavity formed by grooves 38 and 38', the excess extruded material is separated by the clamping action of the portions 12 and 14 and retained.

FIG. 4d, the two support portions 12 and 14 are opened responsive to the withdrawal of the piston 28 and the force of the spring 15 and a spliced monofilament 74 having uniform diameter is removed from the support 10.

While in the preferred apparatus a piston and cylinder arrangement is described for closing the support, any equivalent arrangement of levers or slides and the like, which is mechanically, manually, pneumatically or hydraulically actuated will serve for operating the support portion 14 relative to portion 12.

In an alternative embodiment of the invention the support and resonator assembly may be mounted for actuation by a hand held pistol grip apparatus.

In another embodiment of the apparatus, the frontal portion of the resonator is of arcuate shape to provide when the arcuate surface in the resonator is aligned with grooves in one portion of the support the splicing of two thermoplastic monofilaments which splicing may be achieved in a manner similar to that described above.

While the forming grooves have been described as semi-circular for forming a cylindrical spliced monofilament, grooves of any cross sectional shape may be used for forming splices.

While there have been described and illustrated several embodiments of the present invention, it will be apparent to those skilled in the art that still further modifications may be made without deviating from the broad principle of the invention which shall be limited only by the scope of the appended claims.

What is claimed is:

1. A method of splicing two thermoplastic monofilaments by high frequency vibratory energy to provide a single filament of predetermined cross sectional area comprising the steps of:
   disposing two thermoplastic monofilaments in overlapped relation in a support having forming means and an adjoining flash receiving cavity means;
   applying high frequency vibratory energy to the monofilaments in the region of overlap for softening the respective monofilaments and urging thermoplastic material in excess of the predetermined cross sectional area into the flash receiving cavity;
   removing the vibratory energy;
   urging the two monofilaments while in the forming means and softened state into intimate contact with one another and the monofilament facing wall of the forming means for causing a splice having said predetermined cross sectional area, and
   removing the splice from the support.

2. A method of splicing as set forth in claim 1 and supporting the monofilaments in said support while applying said energy.

3. A method of splicing as set forth in claim 1 and providing stop means for aligning the monofilaments in predetermined overlapped relation.

4. A method of splicing as set forth in claim 1, said high frequency vibratory energy being in the frequency range between 1 kHz and 100 kHz.

5. A method of splicing as set forth in claim 1, said predetermined cross sectional area being substantially equal to the cross sectional area of the respective thermoplastic monofilaments.

6. An apparatus for splicing thermoplastic monofilament material by high frequency vibratory energy including:
   a support comprising two complementary grooved mould portions, each portion having forming means and adjoining flash receiving cavity means;
   said forming means being dimensioned for providing when said two portions are urged into intimate contact with one another a cavity of predetermined cross sectional area;
   said flash receiving cavity means being dimensioned for receiving excess thermoplastic material;
   vibratory energy means disposed for briefly contacting overlapped thermoplastic monofilament material disposed in said grooved mould portions thereby softening and displacing the excess material, and
   means coupled to said portions for urging them into intimate contact with one another after said vibratory energy means is removed from contact with the softened material for moulding the overlapped material into a splice.

7. An apparatus for splicing as set forth in claim 5, and means disposed in said grooved mould portions for aligning and maintaining the monofilaments in an overlapped position.

8. An apparatus for splicing as set forth in claim 6, said means for aligning being spring loaded fingers protruding from said forming means.

9. An apparatus for splicing as set forth in claim 5, said vibratory energy means comprising a converter and resonator dimensioned to be resonant at a frequency in the range between 1 kHz and 100 kHz.

10. An apparatus for splicing as set forth in claim 5, and means for energizing said vibratory energy means.

11. An apparatus for splicing as set forth in claim 5, said predetermined cross sectional area being substantially equal to the diameter of the thermoplastic monofilament material.

* * * * *

UNITED STATES PATENT AND TRADEMARK OFFICE
CERTIFICATE OF CORRECTION

PATENT NO. : 4,032,382
DATED : June 28, 1977
INVENTOR(S) : Edward G. Obeda

It is certified that error appears in the above—identified patent and that said Letters Patent are hereby corrected as shown below:

Column 6, line 30, substitute "6" in place of "5".

Column 6, line 34, substitute "7" in place of "6".

Column 6, line 37, substitute "6" in place of "5".

Column 6, line 41, substitute "6" in place of "5".

Column 6, line 43, substitute "6" in place of "5".

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*